US010301026B2

(12) United States Patent
Tighe et al.

(10) Patent No.: US 10,301,026 B2
(45) Date of Patent: May 28, 2019

(54) PASSENGER PERSONAL UNITS (71) Applicant: JAMES PARK ASSOCIATES LIMITED, Kenton, Harrow, Middlesex (GB)

(72) Inventors: John Tighe, Northchurch (GB); Ben Orson, Dunton Green (GB); James Park, Singapore (SG)

(73) Assignee: James Park Associates Limited, Harrow (GB)

( * ) Notice: Subject to any disclaimer, the term of this patent is extended or adjusted under 35 U.S.C. 154(b) by 340 days.

(21) Appl. No.: 14/783,525

(22) PCT Filed: Apr. 9, 2014

(86) PCT No.: PCT/EP2014/057215
§ 371 (c)(1),
(2) Date: Oct. 9, 2015

(87) PCT Pub. No.: WO2014/167032
PCT Pub. Date: Oct. 16, 2014

(65) Prior Publication Data
US 2016/0083093 A1    Mar. 24, 2016

(30) Foreign Application Priority Data

Apr. 9, 2013 (GB) .................................. 1306432.4

(51) Int. Cl.
*B64D 11/06* (2006.01)
(52) U.S. Cl.
CPC .......... *B64D 11/0601* (2014.12); *B64D 11/06* (2013.01); *B64D 11/0602* (2014.12);
(Continued)

(58) Field of Classification Search
CPC ............ B64D 11/0601; B64D 11/0602; B64D 11/06604; B64D 11/0641
See application file for complete search history.

(56) References Cited

U.S. PATENT DOCUMENTS

| 7,578,470 B2 * | 8/2009 | Plant | B64D 11/06 244/118.6 |
| 8,414,076 B2 * | 4/2013 | Plant | B64D 11/06 244/118.6 |

(Continued)

FOREIGN PATENT DOCUMENTS

| DE | 102006056898 A1 | 6/2008 |
| EP | 1417113 A1 | 5/2004 |

(Continued)

*Primary Examiner* — Philip J Bonzell
(74) *Attorney, Agent, or Firm* — The Concept Law Group, PA; Scott D. Smiley; Scott M. Garrett (57) ABSTRACT A plurality of personal units for aircraft passengers is provided. Each personal unit is arranged to define a longitudinal axis. The personal units are arranged to form first and second columns along a floor to define respective first and second column axes, the personal units in each column being arranged side-by-side in a longitudinally offset relationship at an acute angle to the respective column axis. Each personal unit is arranged to define a personal space for accommodating a person in a seated position and accommodating the person in a recumbent position. At least some of the personal units are arranged such that a portion of the personal space of the respective personal unit is arranged in a stacked relationship, in a direction perpendicular to the floor, with respect to a portion of the personal space of a personal unit in the respective other column.

17 Claims, 12 Drawing Sheets

(52) U.S. Cl.
CPC ...... *B64D 11/0604* (2014.12); *B64D 11/0606* (2014.12); *B64D 11/0641* (2014.12)

(56) References Cited

U.S. PATENT DOCUMENTS

| | | | | |
|---|---|---|---|---|
| 8,622,345 | B2* | 1/2014 | Collins | B64D 11/06 244/118.6 |
| 8,690,254 | B2* | 4/2014 | Cailleteau | B64D 11/06 244/118.6 |
| 8,864,071 | B2* | 10/2014 | Vergnaud | B60N 2/01 244/118.6 |
| 8,882,034 | B2* | 11/2014 | McKeever | B64D 11/06 244/118.6 |
| 8,936,214 | B2* | 1/2015 | Foucher | B64D 11/06 244/118.6 |
| 8,944,379 | B2* | 2/2015 | Orson | B64D 11/06 244/118.6 |
| 9,067,681 | B2* | 6/2015 | Cailleteau | B64D 11/06 |
| 9,216,826 | B2* | 12/2015 | Orson | B64D 11/06 |
| 9,533,765 | B2* | 1/2017 | Vergnaud | B64D 11/06 |
| 2007/0246981 | A1* | 10/2007 | Plant | B64D 11/06 297/248 |
| 2009/0243352 | A1* | 10/2009 | Cailleteau | B64D 11/06 297/188.01 |
| 2010/0116936 | A1* | 5/2010 | Plant | B64D 11/06 244/118.6 |
| 2012/0292957 | A1* | 11/2012 | Vergnaud | B64D 11/06 297/188.08 |
| 2012/0305705 | A1* | 12/2012 | Vergnaud | B60N 2/01 244/118.6 |
| 2013/0106156 | A1* | 5/2013 | Orson | B64D 11/06 297/217.3 |
| 2014/0167461 | A1* | 6/2014 | Cailleteau | B64D 11/06 297/232 |
| 2017/0029117 | A1* | 2/2017 | Vergnaud | B64D 11/06 |

FOREIGN PATENT DOCUMENTS

| | | |
|---|---|---|
| EP | 2154067 A2 | 2/2010 |
| GB | 2326824 A | 1/1999 |
| GB | 2455130 A | 6/2009 |
| JP | H05246355 | 9/1993 |
| JP | 2002527288 | 8/2002 |
| JP | 2005512873 | 5/2005 |
| JP | 2009534248 | 9/2009 |
| JP | 2012519622 | 8/2012 |
| JP | 2013006590 | 1/2013 |
| JP | 2013512815 | 4/2013 |
| WO | WO0021831 A2 | 4/2000 |
| WO | WO03053735 | 7/2003 |
| WO | WO2010100500 | 9/2010 |
| WO | WO2014006607 | 1/2014 |
| WO | WO2014087387 | 6/2014 |

* cited by examiner fig.2 fig.3 fig.10 fig.11

PASSENGER PERSONAL UNITS

CROSS-REFERENCE TO RELATED APPLICATION

This application is a National Phase Application under 35 U.S.C. 371 of PCT/EP2014/057215, filed Apr. 9, 2014, which claims the benefit of Great Britain Patent Application No. 1306432.4 filed Apr. 9, 2013, the entirety of which is incorporated by reference.

FIELD OF THE INVENTION

This disclosure relates to personal units. In particular it relates to personal units for aircraft passengers.

BACKGROUND OF THE INVENTION

A variety of passenger seating systems for aircrafts have been proposed, including GB2326824 and EP1417113. These show "herringbone" arrangements of seat units. Due to the space limitations on an aircraft, there is a desire for each seat unit to take up a minimum amount of space, such that a higher number of seat units can be installed in a given floor area of an aircraft.

The seat units can be configured in a bed mode and a seat mode. The bed mode enables the passenger to lie in a recumbent position on a bed, while the seat mode enables the passenger to sit in a seated position on a seat. Some components that form the seat may also form the bed, and vice versa. There is also a desire to ensure that the bed is of a sufficient length to accommodate even a relatively tall person.

It has been appreciated by the inventors that there are disadvantages with the above arrangements and that improvements can be made.

SUMMARY OF THE INVENTION

An invention is set out in the independent claims. Aspects of the invention provide a plurality of personal units, a kit of parts, and a personal space defining structure. Optional features of embodiments of the invention are set out in the remaining, dependent claims.

In an aspect, there is provided a plurality of personal units for aircraft passengers. Each personal unit is arranged to define a longitudinal axis. The personal units are arranged to form first and second columns along a floor to define respective first and second column axes, the personal units in each column being arranged side-by-side in a longitudinally offset relationship at an acute angle to the respective column axis. Each personal unit is arranged to define a personal space for accommodating a person in a seated position and accommodating the person in a recumbent position. At least some of the personal units are arranged such that a portion of the personal space of the respective personal unit is arranged in a stacked relationship, in a direction perpendicular to the floor, with respect to a portion of the personal space of a personal unit in the respective other column.

The use of a stacking (or overlapping) relationship between part of the personal space of one personal unit in the first column and part of the personal space of another personal unit in the second column provides the space-saving advantage that a vertical region of space can be utilized by more than one personal unit. For example, the foot space of one personal unit may be situated underneath the side space of a personal unit in the other column. This increases the utility of a region of vertical space and benefits from the realization that not all parts of the personal space of a personal unit need to extend fully vertically from the floor to the top of the personal unit. It also benefits from the notion of space-sharing between personal units in adjacent columns and/or between adjacent personal units in the same column. A result is that more personal units can be installed in a given area of floor space, and/or that the length and/or the width of the bed of each personal unit may be increased.

In an aspect, there is provided a plurality of personal units for aircraft passengers, each personal unit being arranged to define a longitudinal axis, the personal units being arranged to form first and second columns along a floor to define respective first and second column axes, the personal units in each column being arranged side-by-side in a longitudinally offset relationship at an acute angle to the respective column axis, each personal unit being arranged to define a personal space for accommodating a person in a seated position and accommodating the person in a recumbent position, wherein at least some of the personal units are arranged such that a stacked part of the personal space of the respective personal unit is arranged in a stacked relationship, in a direction perpendicular to the floor, with respect to a stacked part of the personal space of a personal unit in the respective other column.

In an aspect, there is provided a plurality of personal passenger units for installation on aircraft, each personal unit being arranged to define a longitudinal axis, the personal units being arranged, when installed, to form first and second columns along a floor to define respective first and second column axes, the personal units in each column being arranged side-by-side in a longitudinally offset relationship at an acute angle to the respective column axis, each personal unit being arranged to define a personal space for accommodating a person in a seated position and accommodating the person in a recumbent position, wherein at least some of the personal units are arranged such that a stacked part of the personal space of the respective personal unit is arranged in a stacked relationship, in a direction perpendicular to the floor, with respect to a stacked part of the personal space of a personal unit in the respective other column.

In some embodiments, the stacked part of the personal space of the respective personal unit and the stacked part of the personal space of the personal unit in the respective other column are spaced apart from each other in a direction perpendicular to the floor.

In some embodiments, the at least some of the personal units are arranged such that a stacked part of the personal space of the respective personal unit is arranged in a stacked relationship, in a direction perpendicular to the floor, with respect to a stacked part of the personal space of a personal unit in the respective same column.

In some embodiments, the stacked part of the personal space of the respective personal unit and the stacked part of the personal space of the personal unit in the respective same column are spaced apart from each other in a direction perpendicular to the floor.

In some embodiments, the stacked part of the personal space of the respective personal unit comprises at least part of a foot space for accommodating the person's feet when in the recumbent position.

In some embodiments, the foot space is partially enclosed.

In some embodiments, a first side boundary of the foot space is defined by a foot space side partition.

In some embodiments, the foot space side partition separates the first and second columns.

In some embodiments, the foot space side partition forms part of a foot space layer central partition separating the first and second columns.

In some embodiments, the foot space layer central partition is substantially straight.

In some embodiments, the foot space layer central partition is corrugated.

In some embodiments, the foot space layer central partition extends either side of a notional centre line between the first and second column axes.

In some embodiments, an upper boundary of the foot space is defined by a foot space upper partition.

In some embodiments, a forward end boundary of the foot space is defined by a foot space forward end partition.

In some embodiments, a lower boundary of the foot space is defined by a footrest for supporting the person's feet when in the recumbent position.

In some embodiments, the footrest has a transverse edge defining a notional rearward end boundary of the foot space extending from the transverse edge perpendicularly away from the floor.

In some embodiments, the foot space is located in a foot space layer above the floor.

In some embodiments, the foot space layer is spaced apart from the floor.

In some embodiments, the personal space comprises a side space.

In some embodiments, the side space is accessible to the person when in the seated position.

In some embodiments, the stacked part of the personal space of the personal unit in the respective other column comprises at least part of the side space of the personal unit in the respective other column.

In some embodiments, the stacked part of the personal space of the personal unit in the respective same column comprises at least part of the side space of the personal unit in the respective same column.

In some embodiments, the shortest distance between the side space and the floor is greater than the shortest distance between the foot space and the floor.

In some embodiments, the side space is located in a side space layer above the floor.

In some embodiments, the foot space is located in a foot space layer above the floor, the foot space layer being between the side space layer and the floor.

In some embodiments, a first side boundary of the side space is defined by a side space side partition.

In some embodiments, the side space side partition separates the first and second columns.

In some embodiments, the side space side partition forms part of a side space layer central partition separating the first and second columns.

In some embodiments, the side space layer central partition is substantially straight.

In some embodiments, the side space layer central partition is corrugated.

In some embodiments, the side space layer central partition extends either side of a notional centre line between the first and second column axes.

In some embodiments, a lower boundary of the side space is defined by a shelf.

In some embodiments, the shelf is accessible to the person when in the seated position.

In some embodiments, the shelf has a longitudinal edge defining a notional second side boundary of the side space extending from the longitudinal edge perpendicularly away from the floor.

In some embodiments, the personal space comprises a floor space.

In some embodiments, the stacked part of the personal space of the personal unit in the respective other column comprises at least part of the floor space of the personal unit in the respective other column.

In some embodiments, the stacked part of the personal space of the personal unit in the respective same column comprises at least part of the floor space of the personal unit in the respective same column.

In some embodiments, the floor space is located in a floor space layer above the floor.

In some embodiments, the foot space is located in a foot space layer above the floor, the floor space layer being between the foot space layer and the floor.

In some embodiments, a lower boundary of the floor space is defined by the floor.

In some embodiments, a first side boundary of the floor space is defined by a floor space side partition.

In some embodiments, the floor space side partition separates the first and second columns.

In some embodiments, the floor space side partition forms part of a floor space layer central partition separating the first and second columns.

In some embodiments, the floor space layer central partition is substantially straight.

In some embodiments, the floor space layer central partition is corrugated.

In some embodiments, the floor space layer central partition extends either side of a notional centre line between the first and second column axes.

In some embodiments, the personal space of a respective personal unit is at least partially defined by a partition between the personal space of the respective personal unit and the personal space of a neighbouring personal unit of the plurality of personal units.

In some embodiments, the at least some of the personal units comprise at least one personal unit from each of the first and second columns.

In some embodiments, the personal unit is configurable in a bed mode and configurable in a seat mode.

In some embodiments, in the seat mode a seat is provided.

In some embodiments, the seat is or is not able to swivel.

In an aspect, there is provided a plurality of personal units substantially as described herein with reference to the accompanying drawings.

In an aspect, there is provided a plurality of personal units for aircraft passengers, the personal units being arranged to form first and second columns along a floor, each personal unit being arranged to define a personal space for accommodating a person in a seated position and accommodating the person in a recumbent position, wherein at least some of the personal units are arranged such that a stacked part of the personal space of the respective personal unit is arranged in a stacked relationship, in a direction perpendicular to the floor, with respect to a stacked part of the personal space of a personal unit in the respective other column.

In an aspect, there is provided a kit of parts for forming a plurality of personal units according to any of the above-described aspects and/or embodiments.

In an aspect, there is provided a personal space defining structure for use in forming a plurality of personal units according to any of the above-described aspects and/or embodiments, the personal space defining structure comprising a seat accepting portion for accepting a seat unit in one of the first and second columns and having at least one side wall to one side of the seat accepting portion and a shelf portion extending laterally from the side wall to form a shelf, wherein the personal space defining structure defines a space for at least partially accommodating a foot well of an adjacent personal space defining structure in another one of the first and second columns underneath the shelf portion, when the personal space defining structure is installed, the foot well being configured to create a space for accepting the feet of a passenger in the adjacent personal space defining structure.

a seat accepting portion for accepting a seat unit in one of the first and second columns and having at least one side wall to one side of the seat accepting portion;

a self portion extending laterally from the side wall to form a shelf, wherein the personal space defining structure defines a space for at least partially accommodating a foot well of an adjacent personal space defining structure in another one of the first and second columns underneath the shelf portion, when the personal space defining structure is installed, the foot well being configured to create a space for accepting the feet of a passenger in the adjacent personal space defining structure.

In some embodiments, the personal space defining structure defines a foot well at least partially underneath the shelf portion, the foot well being configured to create a space for accepting the feet of a passenger in a further adjacent personal space defining structure in the one of the first and second columns when the personal space defining structure is installed.

In some embodiments, the personal space defining structure defines the further foot well between an at least partially enclosed storage compartment and the shelf portion.

In some embodiments, the seat accepting portion is configured to accept a seat unit configurable in both a seat mode for supporting a passenger in an upright or reclining posture and a bed mode for supporting a passenger in a recumbent posture.

In an aspect, there is provided a personal space defining structure substantially as described herein with reference to the accompanying drawings.

In an aspect, there is provided a kit of parts for forming a personal space defining structure according to any of the above-described aspects and/or embodiments.

Specific embodiments will now be described by way of example and with reference to the accompanying drawings, in which.

With reference to the Figures, first and second embodiments are now described. Many features of the two embodiments correspond, and they will therefore be described together, with any differences between them being noted.

A plurality of personal units is provided. Each personal unit defines a personal space useable by a single passenger. The personal units are arranged on a substantially flat floor of the aircraft. A first set of the personal units are arranged in a first column and a second set are arranged in a second column. The two columns define first and second column axes. The two columns are substantially parallel.

Each personal unit defines a longitudinal axis between a forward end and a rearward end of the personal unit. The longitudinal axis is parallel to the floor. The forward end is closer to the front of the aircraft. The longitudinal axis of each personal unit is at an acute angle with respect to the respective column axis. Each seat unit in the same column forms substantially the same acute angle.

Each personal unit is configurable in a seat mode and a bed mode. In the seat mode, a seat is situated in the personal unit, and in the bed mode, a bed is situated in the personal unit. The transition between modes is similar to that of GB2326824, which is incorporated by reference herein, in which a seat back reclines and a seat pan moves forwards to form part of the bed.

Figure 6:
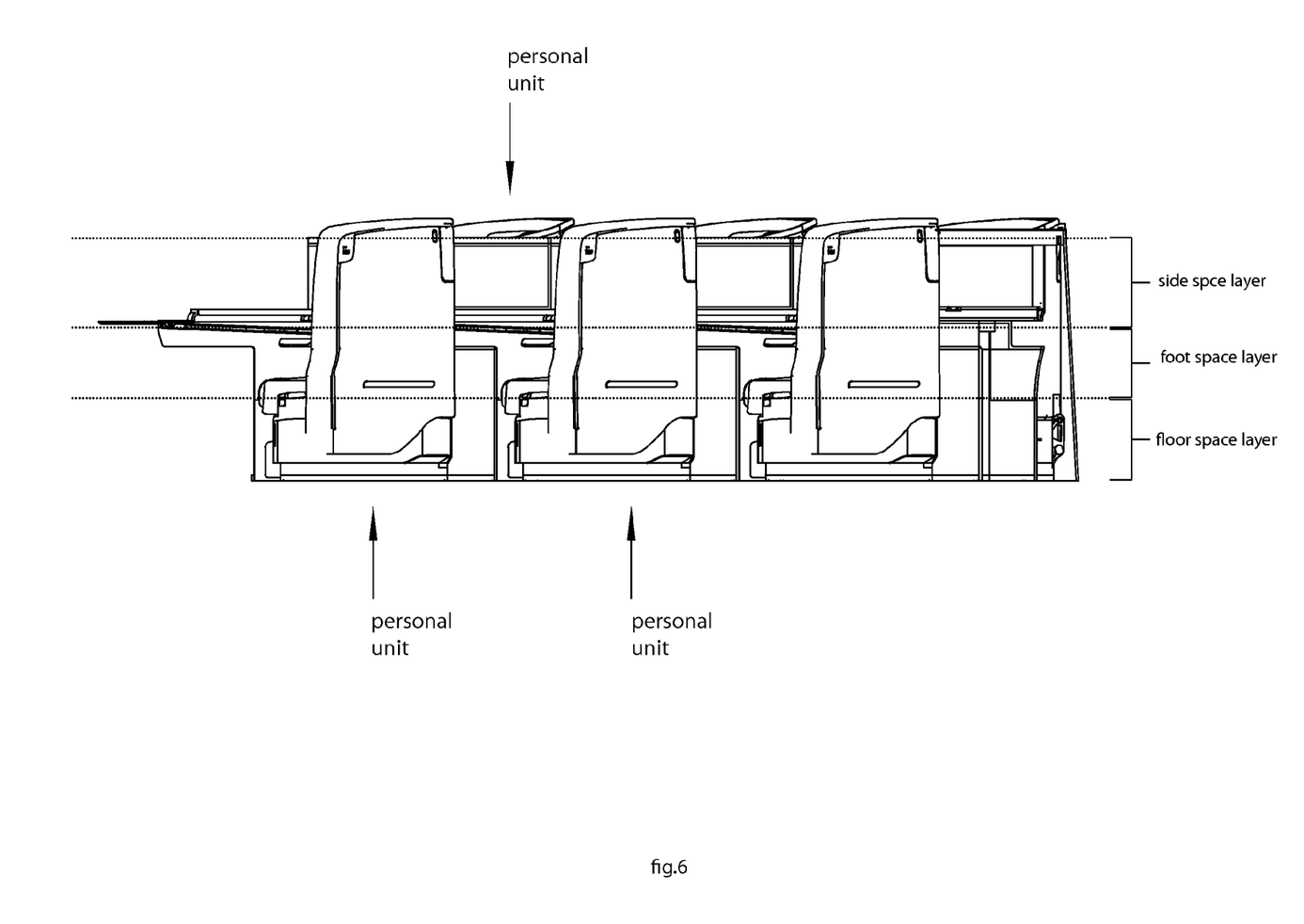
FIG. 6 depicts a side view of the second embodiment.
Figure 7:
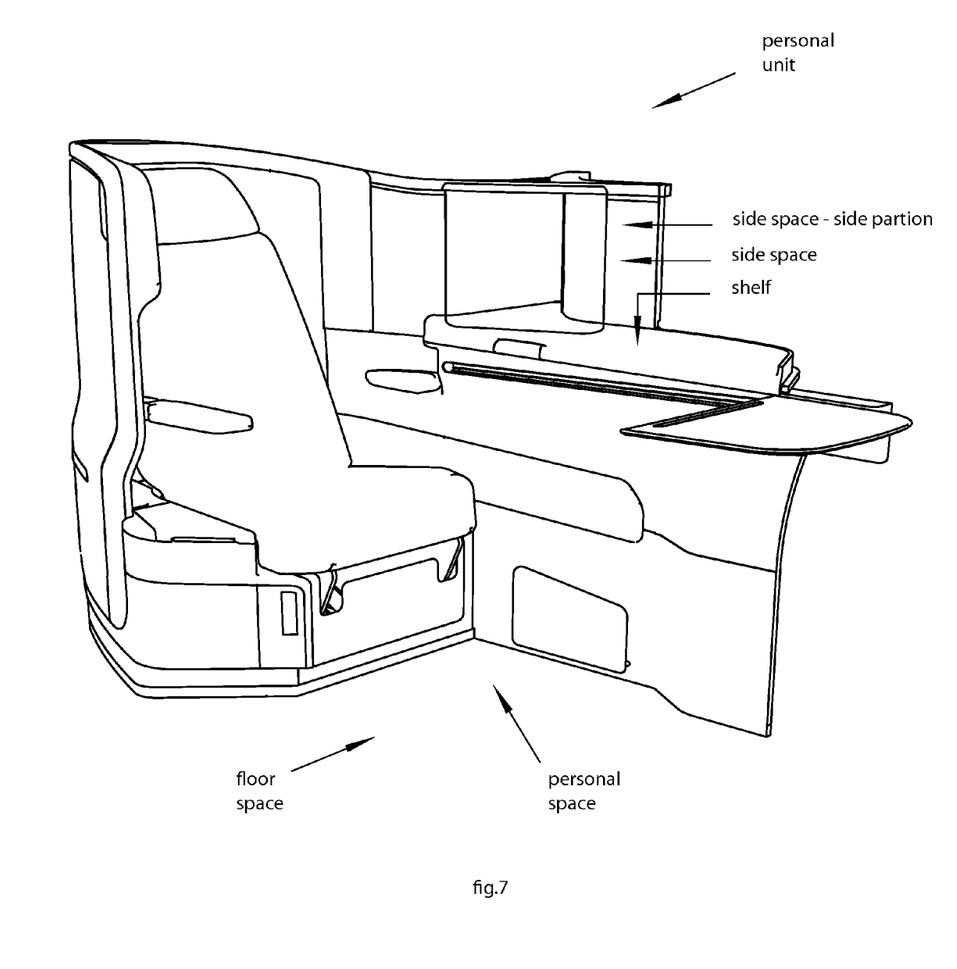
FIG. 7 depicts a perspective view of a backward end of a personal unit of the second embodiment.
Figure 8:
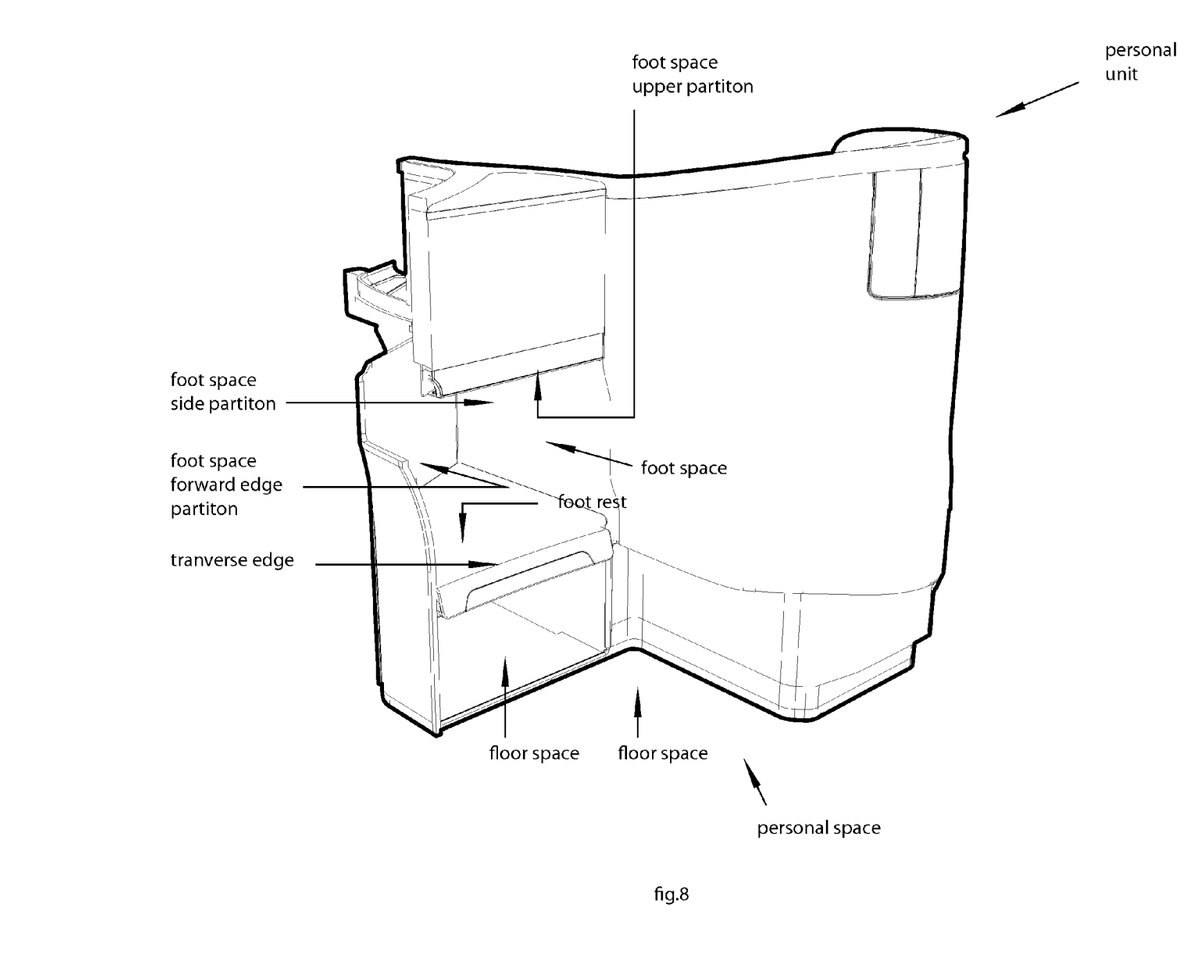
FIG. 8 depicts a perspective view of a forward end of the personal unit of the second embodiment.
Figure 9:
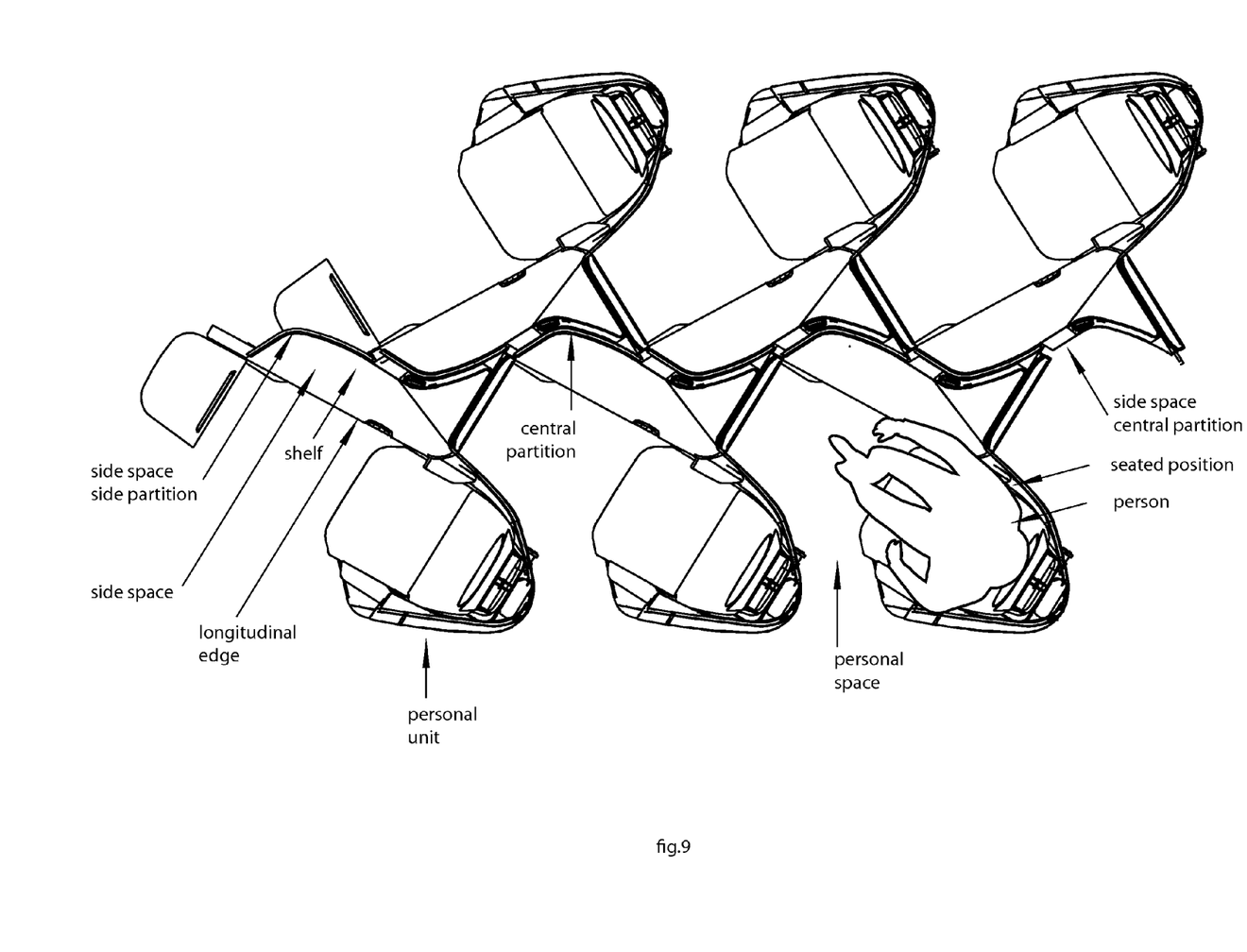
FIG. 9 depicts a section view from above of a side space layer of the second embodiment.
Figure 10:
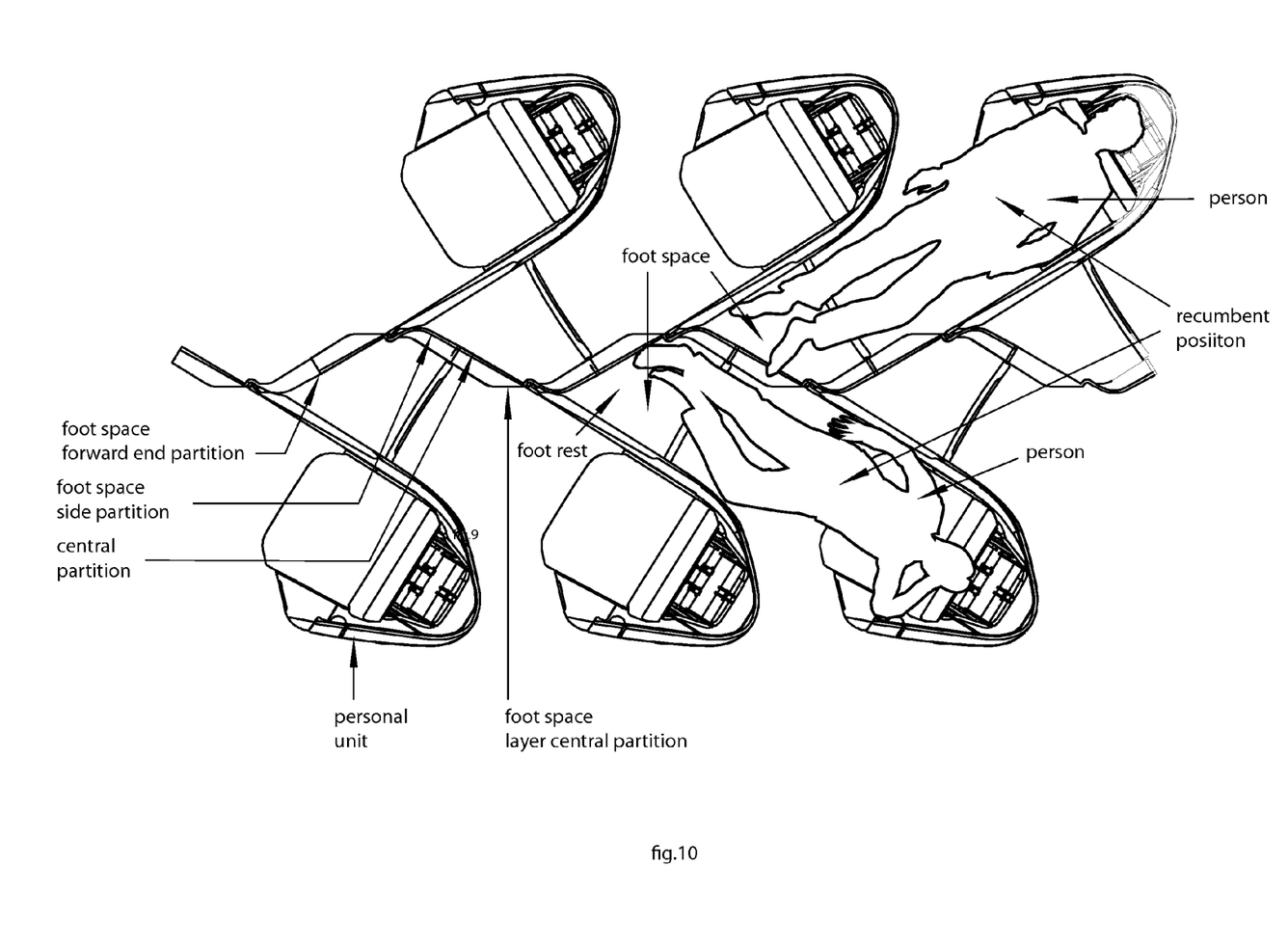
FIG. 10 depicts a section view from above of a foot space layer of the second embodiment.
Figure 11:
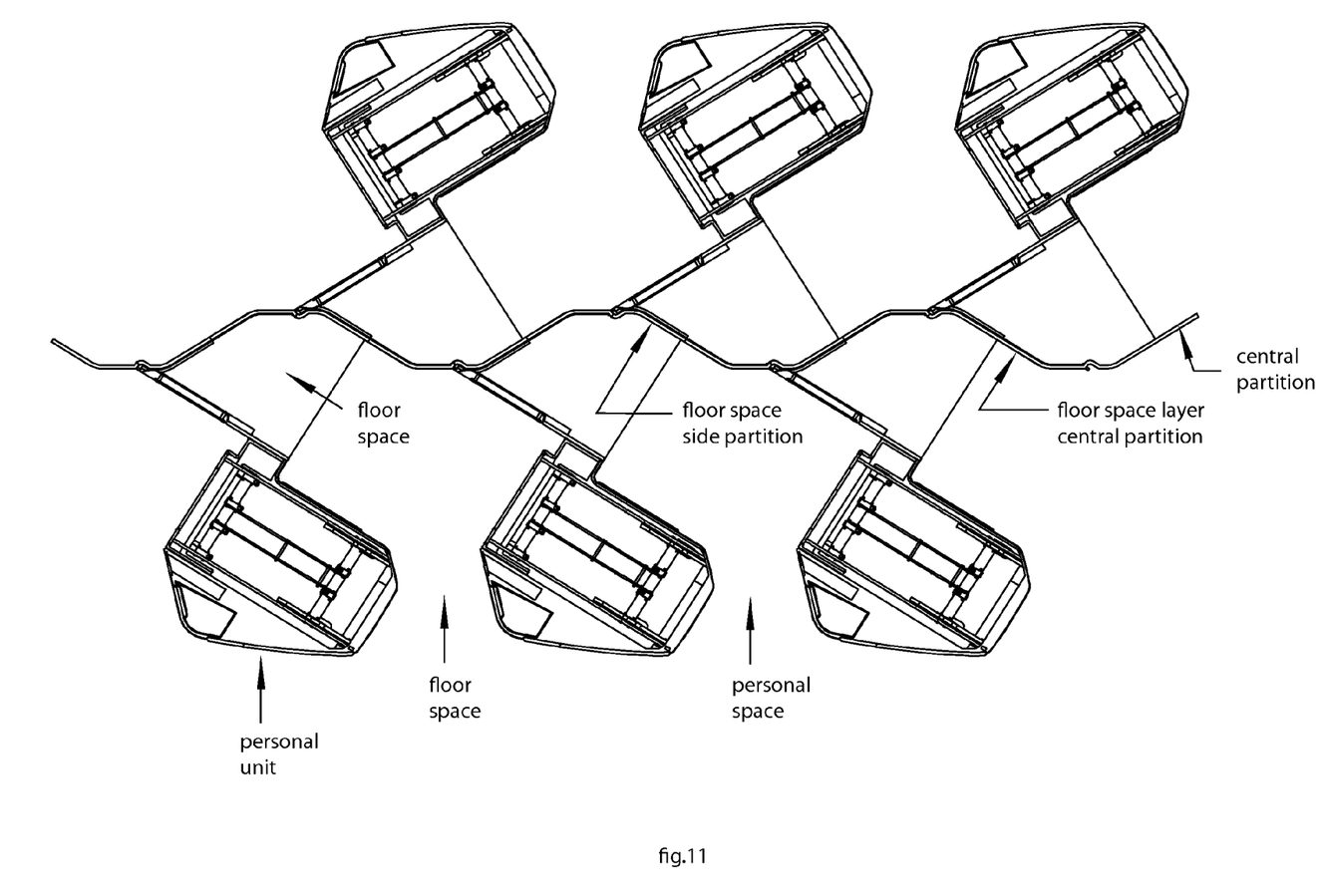
FIG. 11 depicts a section view from above of a floor space layer of the second embodiment.
Figure 12:
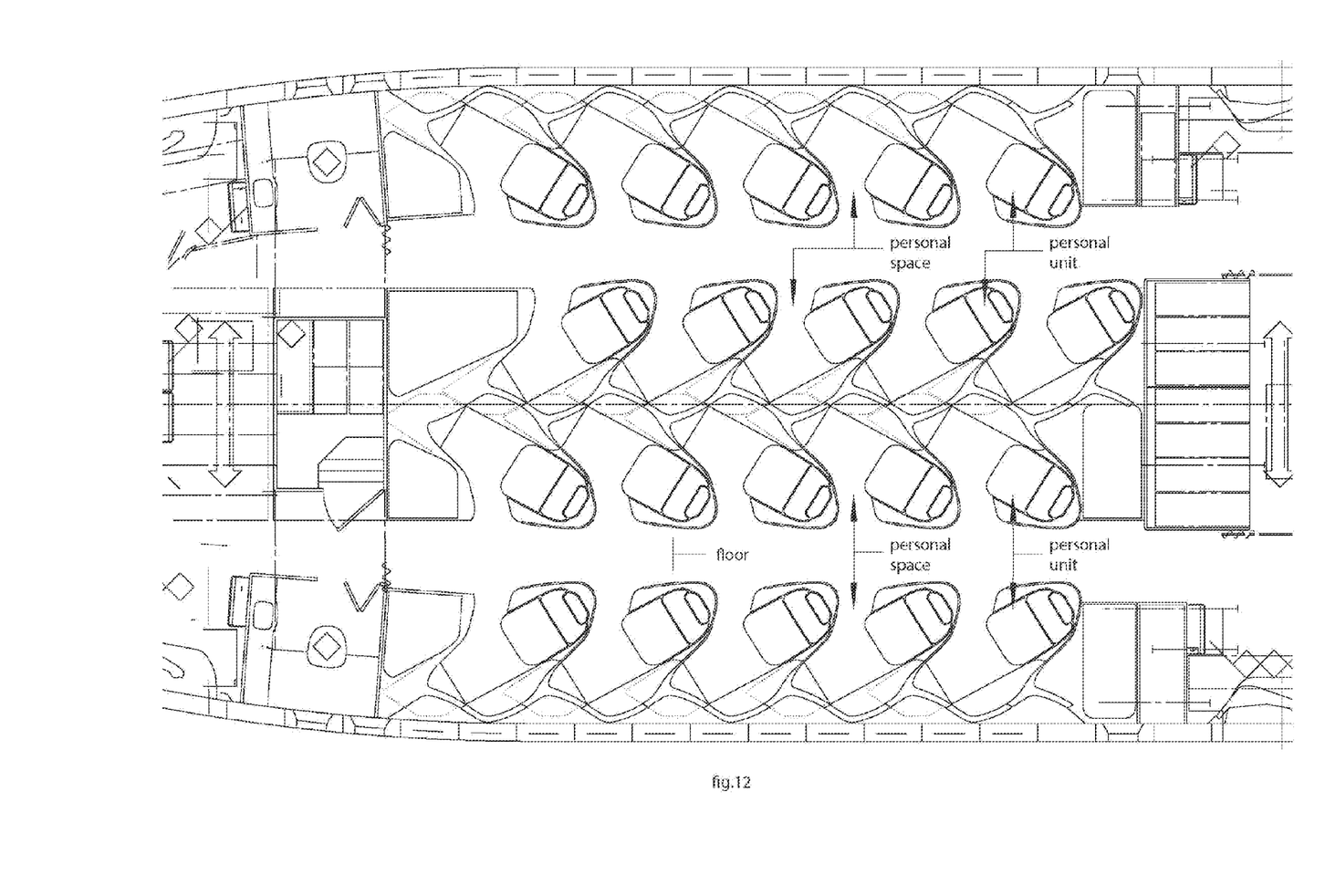
FIG. 12 depicts a four-column arrangement of personal units on an aircraft, including personal units according to the second embodiment.

In FIG. 6, three layers are shown. Each layer is substantially parallel to the floor. The layers are stacked one on top of another, with the floor at the bottom. The lowest layer is the floor space layer, then the foot space layer is next upwards (i.e. in a direction perpendicular to the floor), then the side space layer is at the top. The boundary between the first column and the second column is differently structured in at least two of the respective layers. This results in a situation in which a personal space in one layer of one personal unit is partially stacked with respect to a personal space in another layer of one personal unit in the other column (i.e. the two personal spaces partially overlap, with one personal space extending over the other). Thus, portions of each personal space cross a notional central plane normal to the floor and between the column axes, resulting in a stacked arrangement of portions of personal space in the region of the notional central plane, as described above.

The boundary between the first and second columns in a respective layer is formed at least partially by a partition between the columns. Different partitions in at least two different layers are structured differently. Each or any partition may be, for example, substantially straight (e.g. running parallel to the column axes), or may be, for example, corrugated. The corrugation may be curved, like a sine wave when viewed from above, or may be zig-zagged, like a triangular wave when viewed from above.

The foot space layer includes a foot space, in which the person inserts his feet when in the recumbent position. The foot space is at the forward end of the personal unit. By stacking the foot space with portions of personal space of adjacent personal units, in particular crossing the notional central place, a wider, longer foot space may be achieved.

The side space layer includes a side space, which the person can use and access (at least) when in the seated position. The side space is located to one side of the person when in this position.

The floor space layer includes a floor space. The floor space comprises a space in which the person will put his feet when in the seated position, with the soles of his feet resting on the floor. In some embodiments, the floor space also comprises a space at least partially underneath the foot space, which may be used for storage. In some embodiments, the floor space comprises a space at least partially underneath the side space, which may be used for storage. The gap between these spaces may include part of the foot space of an adjacent personal unit in the same column and/or the foot space of a personal unit in the other respective column.

Each personal unit has the foot space, the floor space and the side space. All of these spaces form part of the personal space for that personal unit.

As will be apparent, the personal units are arranged in an array of units, specifically including two columns of units in the described embodiments. The array is formed by a corresponding array of unit cells or personal space defining units in some embodiments. The unit cells have a portion where a seat unit (configurable in a seat or bed mode) is accepted, and a sidewall to one side of the seat unit, to form a personal space in one of the columns. A shelf portion extends laterally from the side wall, for use by a passenger occupying the personal space. A first foot well (foot space) is in some embodiments defined partially underneath the shelf portion. The first foot well is defined by walls of an adjacent unit cell in the other column. The first foot well protrudes under the shelf portion and is arranged so that it is accessible from the adjacent personal unit in the other column, by a passenger in the adjacent personal unit to place his or her feet in the first foot well, in particular when the respective seat unit is configured in the recumbent bed mode. Additionally, a further foot well is defined under the shelf portion, accessible from an adjacent personal unit in the same column. The shelf portion is therefore situated above part of a foot well from the adjacent personal unit in the same column, and part of a foot well from the adjacent personal unit in the other column.

Thus, it can be seen that in these embodiments two unit cells in the same column define together a personal unit, each unit cell providing one or more elements of the personal unit.

The foot well is, in some embodiments, defined vertically between a storage space and the shelf portion. The storage space is accessible from, depending on the embodiment, the personal unit or the adjacent personal unit or units. In some embodiments, the storage space may be subdivided into a plurality of compartments, each accessible from a respective personal unit.

The unit cell provides further constructional elements in some embodiments to provide the further elements discussed above. The unit cells may all be identical in their contribution to the overall structure, may be differentiated to provide different elements or some elements may be provided separately. For example, some or all of the partitions referred to above may be provided cooperatively by all unit cells, may be provided by a subset of the unit cells or may be provided separately.

The floor space of each personal unit is, in some embodiments, partially defined by a unit cell, in particular where the unit cell provides storage space underneath the foot well, with the remainder being defined by the cabin floor. In other embodiments, the floor space may be defined entirely by a unit cell, or a combination of unit cells. In yet other embodiments, the floor space is defined entirely by the cabin floor.

The personal units are attached to tracks that run under or along the floor, parallel to the respective column axis.

Figure 1:
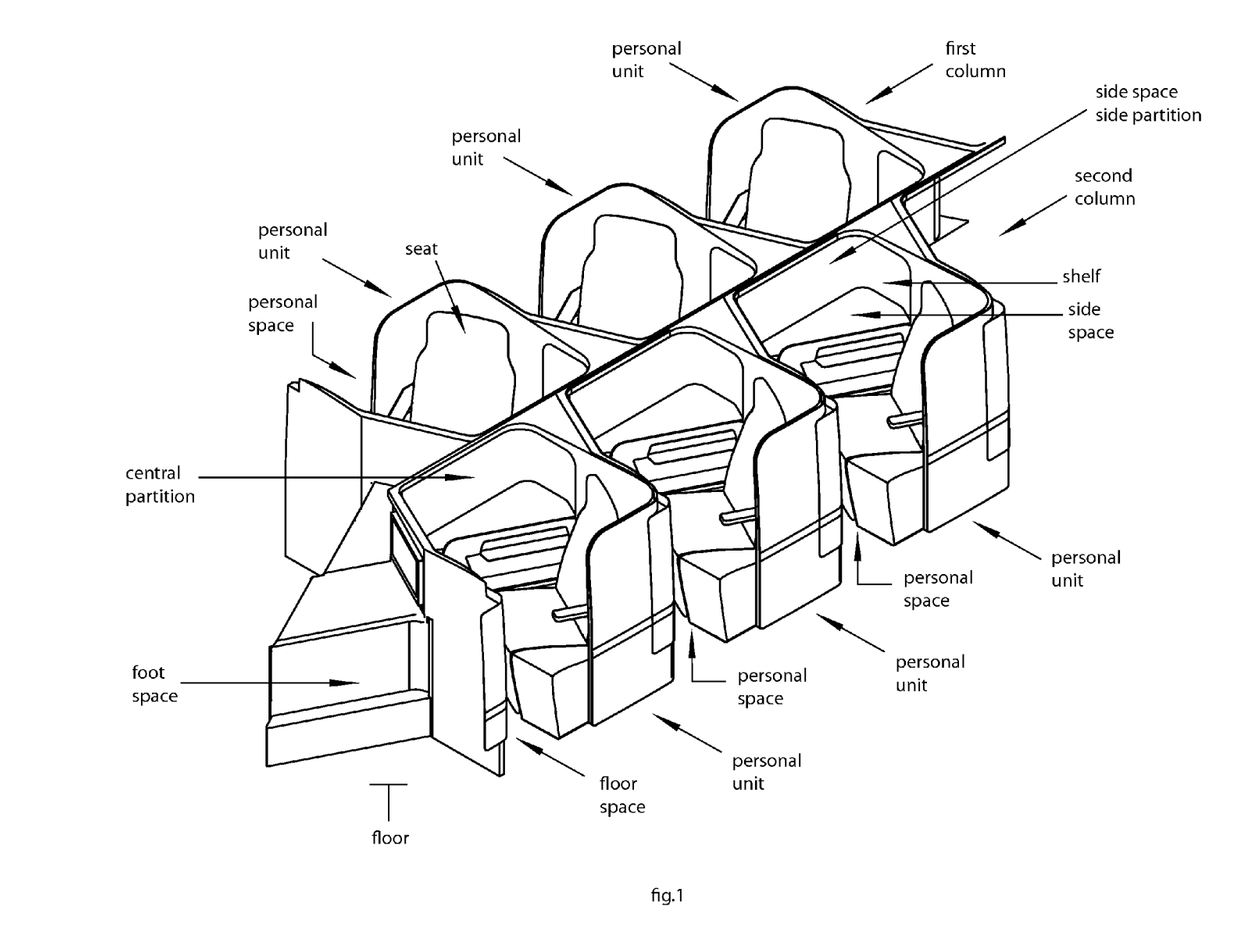
FIG. 1 depicts a perspective view of a first embodiment.
Figure 2:
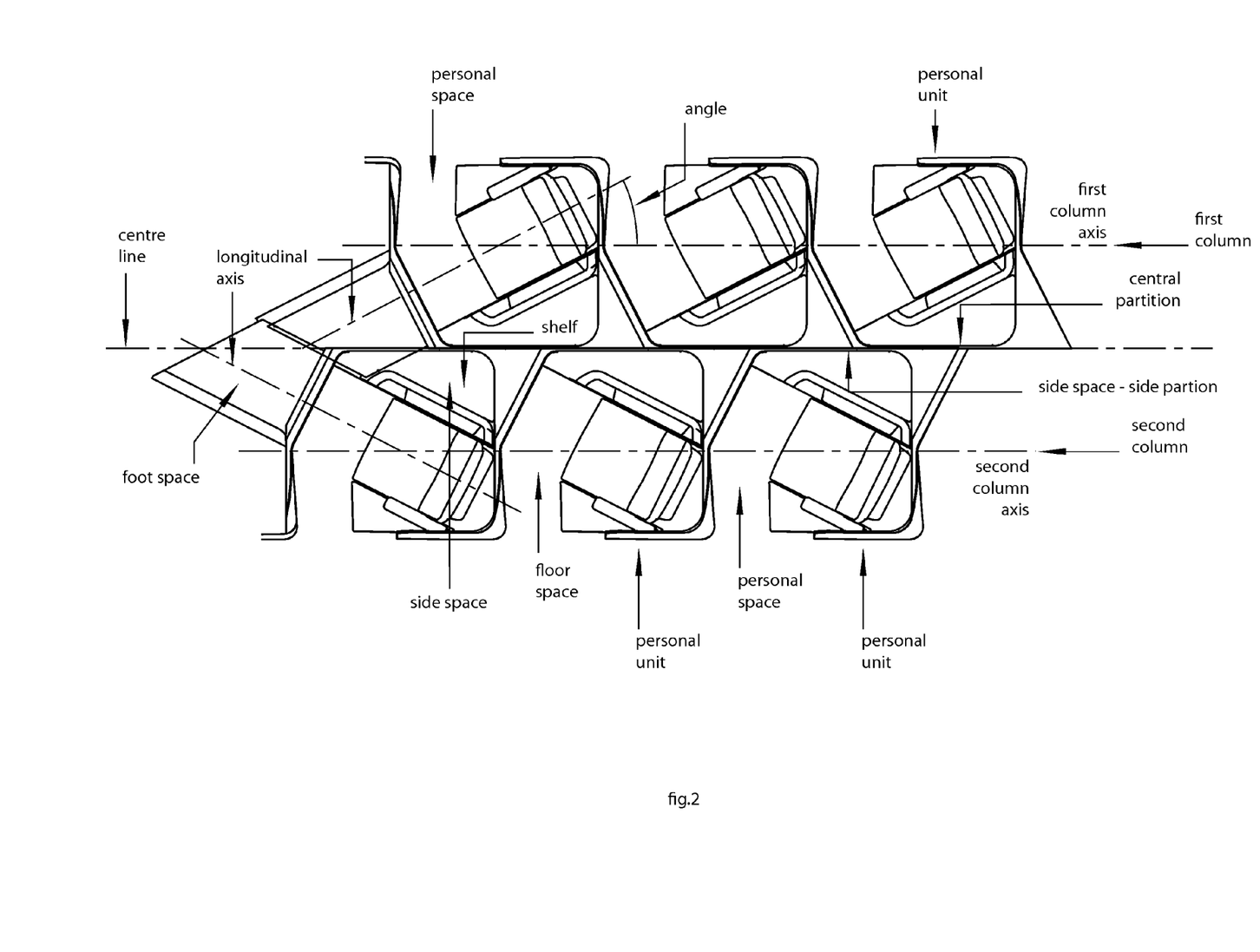
FIG. 2 depicts a plan view from above of the first embodiment.
Figure 3:
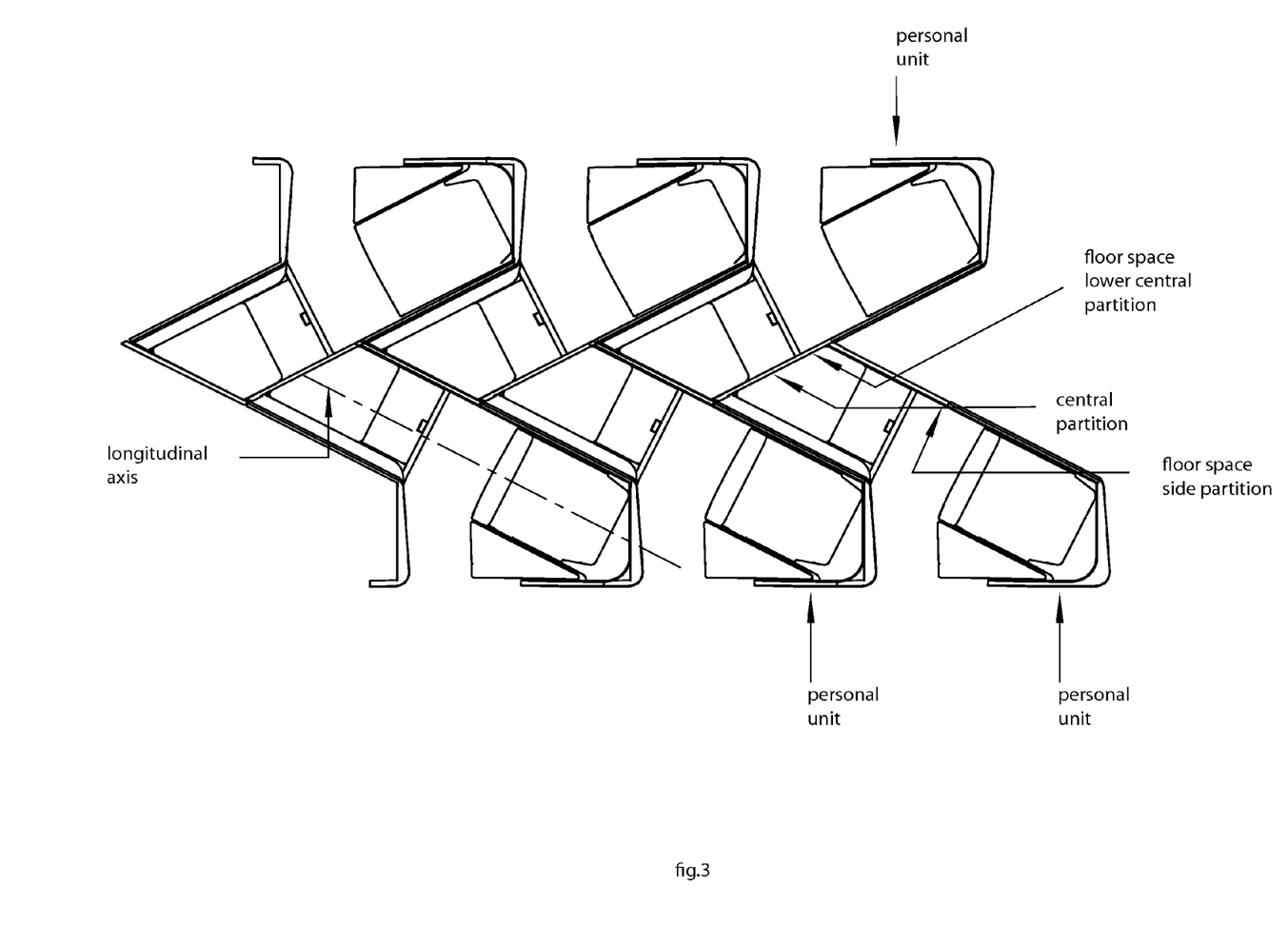
FIG. 3 depicts a plan view from below of the first embodiment.
Figure 4:
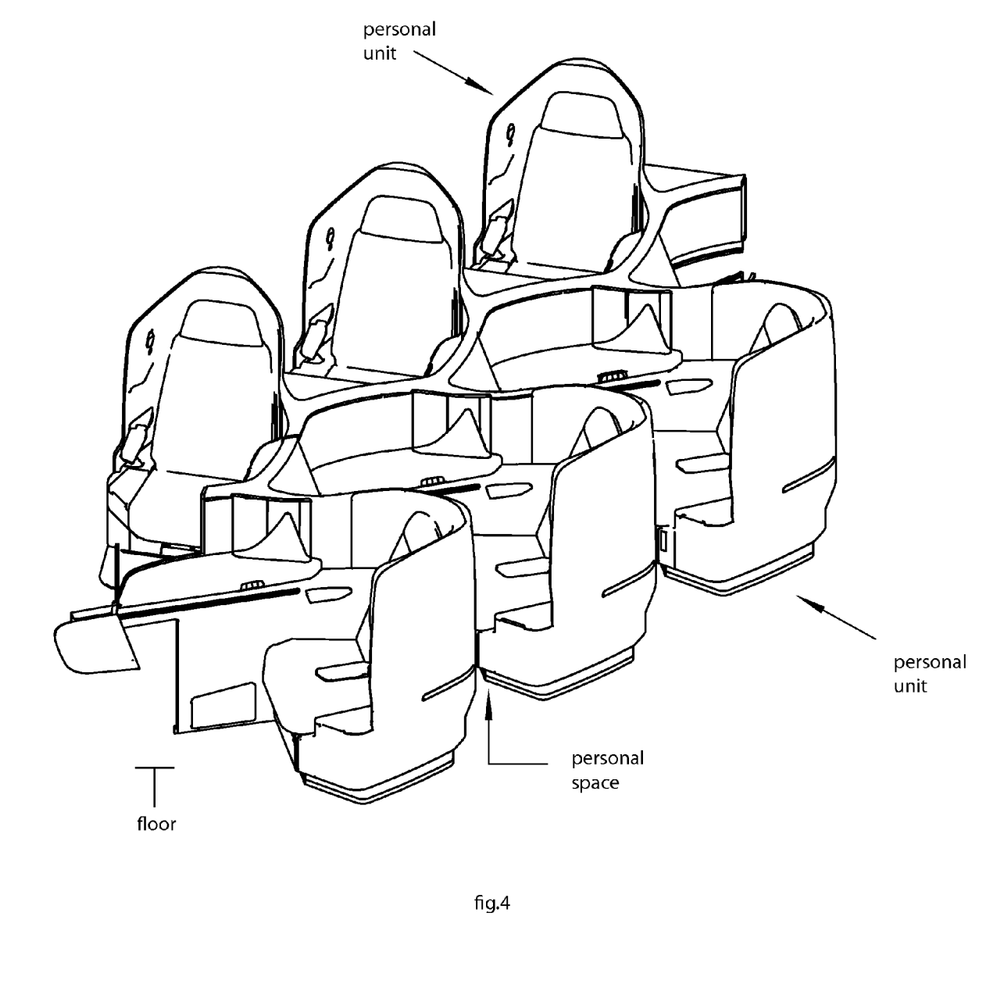
FIG. 4 depicts a perspective view of a second embodiment.
Figure 5:
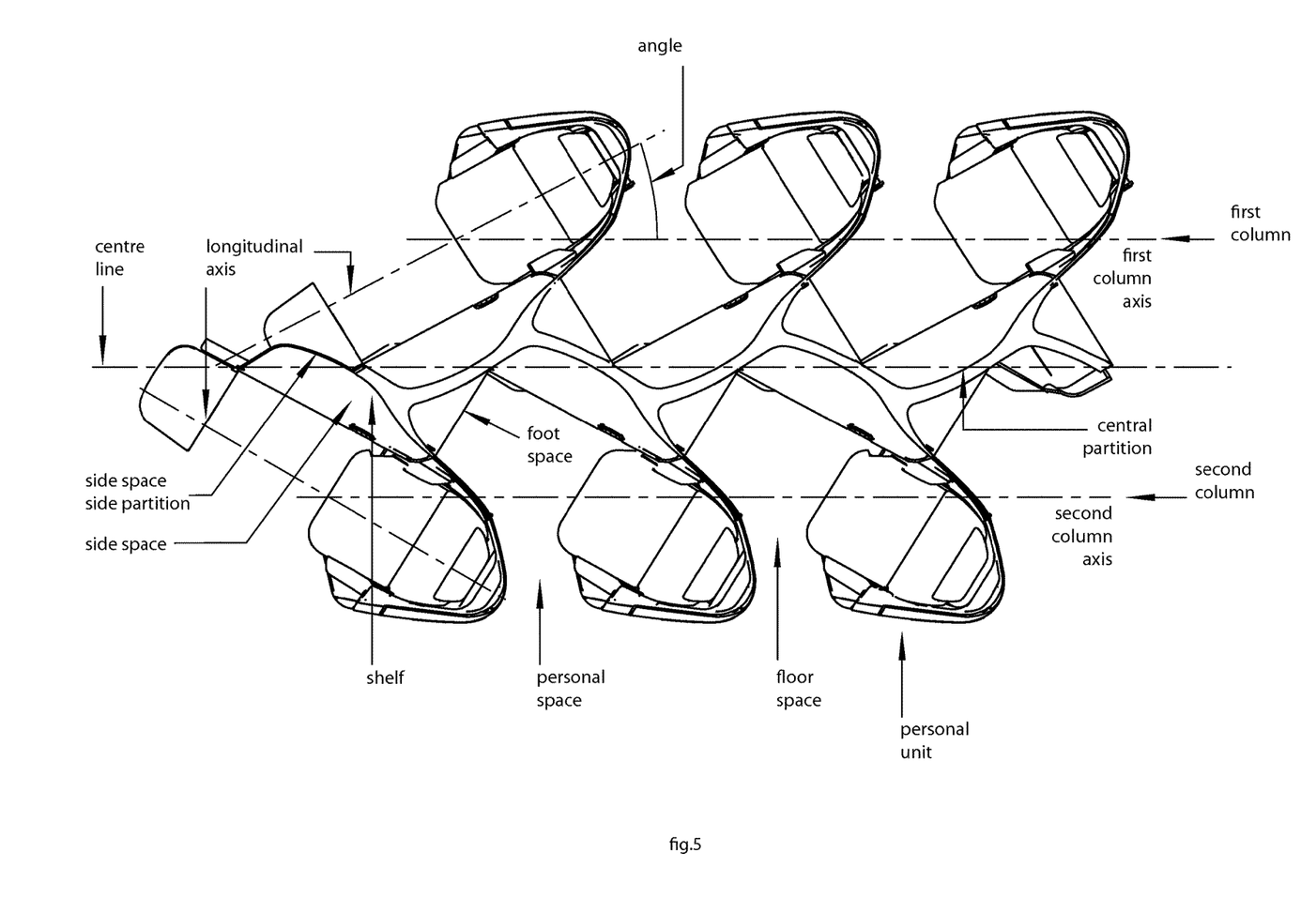
FIG. 5 depicts a plan view from above of the second embodiment.

In the first embodiment, as shown in FIGS. 1, 2 and 3, in the side space layer, the central partition between the two columns is straight (i.e. it is in a plane normal to the floor and parallel to the first and second column axes). In the foot space layer and the floor space layer, the central partition between the two columns is zigzagged. The zigzagging parts cross either side of the central partition in the side space layer. The foot space and the floor space of each personal unit therefore extends underneath the central partition in the side space layer. The floor space and the foot space of a respective personal unit extend in the forward direction until it reaches a partition defining a side of a respective personal unit in the other column. Each straight part of the zigzag therefore defines a forward end of the foot space and the floor space, respectively. The personal units are therefore arranged in these layers in an "interlocking herringbone" formation. The zigzag formed between the two columns has internal angles that are obtuse (e.g. 100°-170° or 120°-150°), which results in the forward end of the foot space and the floor space not being perpendicular to the sides of the personal unit. One side of the personal unit is therefore longer than the other, which results in a longer maximum length of the personal unit. In the foot space layer, this creates a longer maximum length of the part of the personal space that is occupied by the person when in the recumbent position. (In other embodiments, the zigzag is formed of right-angles.)

In the second embodiment, as shown in FIGS. 4 to 12, in the side space layer, the central partition between the two columns is corrugated, such that the side space side partition extends substantially more parallel to the longitudinal axis of the personal unit than in the first embodiment. The shelf is therefore of a substantially uniform width, rather than being substantially triangular. The foot space layer and the floor space layer are structured similarly to the first embodiment, but with a more corrugated central partition.

It will be understood that the above description of specific embodiments is by way of example only and it is not intended to limit the scope of the present disclosure. Many modifications of the described embodiments, some of which are now described, are envisaged and intended to be within the scope of the present disclosure.

In some embodiments, a footrest defining a lower boundary of the foot space has an extendable part extendable towards the backward end of the personal unit, which may assist in forming the bed. The extension may take the form of a flip-up extension or a drawer that slides from under the footrest. A seat pan extension may also be analogously formed to extend forward from the seat pan.

In some embodiments the seating system is for other transport vehicles, or for non-transport applications.

In some embodiments, the personal units are not in a "herringbone" type arrangement but are differently arranged.

In some embodiments, the seats convert into beds according to EP1417113, which is incorporated by reference herein, in which a backrest of the seat unit is folded forward, with the opposite side of the backrest used to form part of the bed.

In some embodiments there are only two or more than three layers. In some embodiments two or more layers at least partially overlap vertically or are spaced apart vertically from each other.

In some embodiments the angle between the longitudinal axis and the respective column axis is about 30 degrees. In some embodiments, the angle is in the range 20 to 55 degrees.

In some embodiments, the personal units in the first column are offset from the respective personal units in the second column, in a direction parallel to the column axes, by an amount which is between 0 and 1 times the distance between adjacent personal units in the same direction, for example about 0.5 times or 0.2 to 0.8 times.

What is claimed is:

1. A plurality of personal units for aircraft passengers comprising:
 each of the personal units being arranged to define a longitudinal axis and to define a personal space for accommodating a person in a seated position of the personal unit and accommodating the person in a recumbent position of the personal unit, the plurality of personal units being arranged to form first and second columns along a floor to define respective first and second column axes, and in each of the respective first and second columns the personal units are further arranged in a side-by-side relationship with one another and longitudinally offset and facing toward the other column at an acute angle to the respective column axis;
 wherein at least two of the plurality of personal units are arranged such that a stacked part of a foot space of the personal space of a first of the at least two of the plurality of personal units in the respective first column is arranged in a stacked relationship, in a direction perpendicular to the floor, with respect to a stacked part of a side space of the personal space of a second of the at least two of the plurality of personal units in the respective second column.

2. The plurality of personal units of claim 1, wherein at least two of the plurality of personal units are arranged in the first column such that a stacked part of the personal space of a first of the at least two plurality personal units in the first column is arranged in a stacked relationship, in a direction perpendicular to the floor, with respect to a stacked part of the personal space of a second of the at least two plurality of personal units in the first column.

3. The plurality of personal units of claim 2, wherein the stacked part of the personal space of the first of the at least two of the plurality of personal units arranged in the first column comprises at least part of a side space, defined by the personal space, of the second of the at least two plurality of personal units in the first column.

4. The plurality of personal units of claim 2, wherein the stacked part of the personal space of the first of the at least two of the plurality personal units in the first column comprises at least part of a floor space, defined by the personal space, of the second of the at least two of the plurality of personal units in the first column.

5. The plurality of personal units of claim 1, wherein the foot space accommodates a person's feet when the first of the at least two personal units is in the recumbent position.

6. The plurality of personal units of claim 5, wherein the foot space is partially enclosed.

7. The plurality of personal units of claim 5 or claim 6, wherein a first side boundary of the foot space is defined by a foot space side partition.

8. The plurality of personal units of claim 7, wherein the foot space side partition separates the first and second columns.

9. The plurality of personal units of claim 1, wherein the side space extends across a centerline defined between the first and second columns.

10. The plurality of personal units of claim 9, wherein the side space is accessible to the person when in the seated position.

11. The plurality of personal units of claim 9 or claim 10, wherein the stacked part of the personal space of the first of the at least two of the plurality of personal units in the respective first column comprises at least part of the side space of the second of the at least two of the plurality of personal units in the respective second column.

12. The plurality of personal units of claim 9 or claim 10, wherein a lower boundary of the side space is defined by a shelf.

13. The plurality of personal units of claim 1, wherein the personal space comprises a floor space.

14. The plurality of personal units of claim 13, wherein the stacked part of the personal space of the first of the at least two of the plurality of personal units in the respective first column comprises at least part of the floor space of the second of the at least two of the plurality of personal units in the respective second column.

15. A kit of parts for forming a plurality of personal units comprising:
 a plurality of personal units for aircraft passengers, each of the plurality of personal units being arranged to define a longitudinal axis and to define a personal space for accommodating a person in a seated position of the personal unit and accommodating the person in a recumbent position of the personal unit;
 the plurality of personal units being arranged to form first and second columns along a floor to define respective first and second column axes, and in each of the respective first and second columns the personal units are further arranged in a side-by-side relationship with one another and longitudinally offset and facing toward the other column at an acute angle to the respective column axis;
 wherein at least two of the plurality of personal units are arranged such that a stacked part of the personal space of a first of the at least two of the plurality of personal units in the respective first column includes a foot space and is arranged in a stacked relationship, in a direction perpendicular to the floor, with respect to a stacked part of the personal space of a second of the at least two of the plurality of personal units in the respective second column that includes a side space.

16. A plurality of personal units for aircraft passengers comprising:
 a first column of personal units defining a first column axis;
 a second column of personal units defining a second column axis that is parallel to the first column axis;
 wherein the at least one of the plurality of personal units in each of the first and second columns have a personal space including a foot space, and side space, and a seat, and define longitudinal axis from the foot space to the seat that is at an acute angle relative to the respective first and second column axes;
 wherein at least one of the plurality of personal units of the first column and the at least one of the plurality of personal units of the second column are arranged in a zig zag relationship such that the foot space of the at least one of the plurality of personal units of the first column extends across a centerline defined between the first and second columns and under the side space of the at least one of the plurality of personal units of the second column.

17. The plurality of personal units as recited in claim 16, wherein the foot space and side space of each of the at least one of the plurality of personal units of the first and second columns extends across the centerline.

* * * * *